(12) United States Patent
Carter et al.

(10) Patent No.: US 7,386,680 B2
(45) Date of Patent: Jun. 10, 2008

(54) APPARATUS AND METHOD OF CONTROLLING DATA SHARING ON A SHARED MEMORY COMPUTER SYSTEM

(75) Inventors: John Carter, Salt Lake City, UT (US); Randal S. Passint, Chippewa Falls, WI (US); Liqun Cheng, Salt Lake City, UT (US); Donglai Dai, Eau Claire, WI (US)

(73) Assignee: Silicon Graphics, Inc., Sunnyvale, CA (US)

( * ) Notice: Subject to any disclaimer, the term of this patent is extended or adjusted under 35 U.S.C. 154(b) by 223 days.

(21) Appl. No.: 11/413,620

(22) Filed: Apr. 28, 2006

(65) Prior Publication Data

US 2006/0265554 A1 Nov. 23, 2006

Related U.S. Application Data

(60) Provisional application No. 60/676,551, filed on Apr. 29, 2005.

(51) Int. Cl.
 *G06F 12/00* (2006.01)
(52) U.S. Cl. ....................... 711/145; 711/147
(58) Field of Classification Search ............... None
 See application file for complete search history.

(56) References Cited

U.S. PATENT DOCUMENTS

2003/0196047 A1* 10/2003 Kessler et al. ............... 711/147
2004/0268052 A1* 12/2004 Glasco ....................... 711/141
2006/0031450 A1* 2/2006 Unrau et al. ................ 709/223
2006/0143403 A1* 6/2006 Barrett et al. ............... 711/141

OTHER PUBLICATIONS

Hazim Abdel-Shafi et al., *An Evaluation of Fine-Grain Producer-Initiated Communication in Cache-Coherent Multiprocessors*, Third International Symposium on High Performance Computer Architecture, Feb. 1-5, 1997, pp. 1-12.
Manuel E. Acacio et al., *Owner Prediction for Accelerating Cache-to-Cache Transfer Misses in a cc-NUMA Architecture*, 0-7695-1524-X IEEE (2002), 12 pages.
Manuel E. Acacio et al., *The Use of Prediction for Accelerating Upgrade Misses in cc-NUMA Multiprocessors*, 10 pages (2002).
D.H. Bailey et al., *The NAS Parallel Benchmarks*, The International Journal of Supercomputer Applications, vol. 5, No. 3, Fall 1991, pp. 63-73.
John B. Carter et al., *Implementation and Performance of Munin*, Computer Systems Laboratory, Rice University, Houston, TX, Oct. 1991, 13 pages.

(Continued)

*Primary Examiner*—Kevin Verbrugge
(74) *Attorney, Agent, or Firm*—Bromberg & Sunstein LLP (57) ABSTRACT

An apparatus and method of controlling data sharing in a shared memory computer system transfers control of a cache coherency directory (entry) to a node having control of the data. Specifically, the plurality of nodes includes a home node and a second node. The home node has given data in a cache line in its memory, and also has a directory identifying the state of the cache line. The method and apparatus thus detect a request for ownership of the cache line from the second node, and enable the second node to control the directory after receipt of the request.

22 Claims, 6 Drawing Sheets

OTHER PUBLICATIONS

Håkan Grahn et al., *Implementation and Evaluation of Update-Based Cache Protocols Under Relaxed Memory Consistency Models*, accepted for publication in Future Generation Computer Systems, Jun. 1995, 32 pages.

D.A. Koufaty et al., *Data Forwarding in Scalable Shared-Memory Multiprocessors*, Proceedings of the 9th Annual International Symposium on Computer Architecture, 1995, 10 pages.

An-Chow Lai et al., *Memory Sharing Predictor: The Key to a Speculative Coherent DSM*, Proceedings of the 26th International Symposium on Computer Architecture (ISCA 26), 1999, 12 pages.

An-Chow Lai et al., *Selective, Accurate, and Timely Self-Invalidation Using Last-Touch Prediction*, Proceedings of the 27th Annual International Symposium on Computer Architecture, Jun. 2000, 10 pages.

James Laudon et al., *The SGI Origin: A ccNUMA Highly Scalable Server*, Jun. 1997, 11 pages.

Daniel Lenoski et al., *The Directory-Based Cache Coherence Protocol for the DASH Multiprocessor*, Proceedings of the 17th Annual International Symposium on Computer Architecture, 1990, pp. 148-159.

Shubhendu S. Mukherjee et al., *Using Prediction to Accelerate Coherence Protocols*, Proceedings of the 25th Annual International Symposium on Computer Architecture, 1998, 12 pages.

Umakishore Ramachandran et al., *Architectural Mechanisms for Explicit Communication in Shared Memory Multiprocessors*, In Supercomputing '95: Proceedings of the 1995 ACM/IEEE Conference on Supercomputing, 1995, 23 pages.

Steven Cameron Woo et al., *The SPLASH-2 Programs: Characterization and Methodological Considerations*, Proceedings of the 22nd Annual International Symposium on Computer Architecture, Jun. 1995, pp. 24-36.

Per Stenström et al., *An Adaptive Cache Coherence Protocol Optimized for Migratory Sharing*, Proceedings of the 20th Annual International Symposium on Computer Architecture, May 1993, pp. 109-118.

David K. Poulsen et al., *Date Prefetching and Data Forwarding in Shared Memory Multiprocessors*, ICCP, 1994, 5 pages.

\* cited by examiner

APPARATUS AND METHOD OF CONTROLLING DATA SHARING ON A SHARED MEMORY COMPUTER SYSTEM

PRIORITY

This patent application claims priority from provisional U.S. patent application No. 60/676,551, filed Apr. 29, 2005 entitled, "DIRECTORY DELEGATION AND UPDATE PUSHING IN SHARED MEMORY MICROPROCESSOR SYSTEMS," and naming John Carter, Randal S. Passint, Lixin Zhang, and Donglai Dai as inventors, the disclosure of which is incorporated herein, in its entirety, by reference.

FIELD OF THE INVENTION

The invention generally relates to multiprocessor computing systems and, more particularly, the invention relates to coherence operations in multiprocessor computing systems.

BACKGROUND OF THE INVENTION

Nodes in a shared multiprocessor computing system generally cache data (from main memory) that may be accessed by other nodes in the system. When a node changes the data stored in such shared memory, however, all other nodes sharing (i.e., caching) such data should be notified of the change (e.g., via invalidation or updating processes) to ensure data coherency. If not notified of changes, the other nodes undesirably may use data that no longer is valid, thus corrupting system operation.

To mitigate this problem, "home nodes" in systems using directory based write invalidate protocols, for example, maintain a directory for tracking the global coherence state of cache lines that are mapped to its portion of the global memory. Such protocols, however, also permit other nodes ("producers") to modify the data in these cache lines. In other words, a producer may modify data mapped to another node's portion of the global memory.

During use, some other node (a "consumer") also may request access to data mapped to the home node's portion of the global memory space. Prior to the request, however, a producer node may have changed such data. In that case, to maintain coherency, the three nodes of interest (consumer, producer, and home nodes) all generate and transmit multiple messages throughout the system. Details of this process are described in the provisional United States patent application from which this application claims priority. Undesirably, these messages can unduly slow down system performance. Moreover, such prior art systems can cause remote read miss stalls. The effect of these messages is more pronounced in systems having many nodes (e.g., supercomputers having hundreds or thousands of nodes).

SUMMARY OF THE INVENTION

In accordance with one aspect of the invention, an apparatus and method of controlling data sharing in a shared memory computer system transfers control of a cache coherency directory (entry) to a node having control of the data. Specifically, the plurality of nodes includes a home node and a second node. The home node has given data in a cache line in its memory, and also has a directory identifying the state of the cache line. The method and apparatus thus detect a request for ownership of the cache line from the second node, and enable the second node to control the directory after receipt of the request.

Some embodiments permit the second node to modify the given data and store the given data on the second node after the given data is modified. Such given data then may be forwarded to a set of consumer nodes in the system after the given data is modified. In addition, the method and apparatus may enable the second node to update the directory after the second node controls the directory. Moreover, the second node may receive a request directly from a third node for a read copy of the given data. This third node bypasses the home node to make that request. A message identifying the second node as the node controlling the directory also may be forwarded to a set of consumer nodes in the system.

A new node (in the plurality of nodes) may request access to the given data from the home node. In that case, the home node may forward a redirect message to the new node. The redirect message indicates that the second node controls the directory. In response to receipt of the redirect message, the new node may directly request a read copy of the given data from the second node. In addition, the second node may forward the given data to the new node and downgrade to a shared state to the cache line. In similar embodiments, a third node requests ownership of the cache line after the second node controls the directory. In that instance, the method and apparatus may enable the third node to control the directory after receipt of the request from the third node.

In some embodiments, the method and apparatus may determine if the home node will control the directory, or if the second node will control the directory. Accordingly, in such embodiments, directory delegation is not automatic.

In accordance with another aspect of the invention, an apparatus for controlling data sharing in a shared memory computer system similar to that discussed above has a request input for receiving a request, from the second node, for ownership of the cache line of the home node. The apparatus also has a memory controller operatively coupled with the request input. The memory controller enables the second node to control the directory after the request input receives the request.

Illustrative embodiments of the invention are implemented as a computer program product having a computer usable medium with computer readable program code thereon. The computer readable code may be read and utilized by a computer system in accordance with conventional processes.

BRIEF DESCRIPTION OF THE DRAWINGS

The foregoing advantages of the invention will be appreciated more fully from the following further description thereof with reference to the immediately below described drawings.

DESCRIPTION OF ILLUSTRATIVE EMBODIMENTS

Illustrative embodiments of the invention selectively change control of a cache coherency directory associated with a cache line as new nodes take ownership of such cache line. For example, if a new node takes ownership of a given cache line of a home node, various embodiments may (in certain favorable circumstances) dynamically delegate control of the associated directory to the new node. Moreover, after being notified that the new node controls the noted directory, other nodes may bypass the home node by directly requesting access to the relevant data from the new node. Consequently, when compared to prior art processes known to the inventors, such embodiments eliminate certain requests to the home node, thus reducing network congestion within the computer system. Moreover, such embodiments should substantially mitigate remote read miss stalls. In some embodiments, the owner also proactively pushes read only data toward the node consuming the data. Details of various embodiments are discussed below.

As a preliminary matter, it should be noted that reference to a "directory" herein generally implies the metadata associated with tracking the state of a single cache-line-sized piece of data, often referred to in the art as a "directory entry." Accordingly, unless the context requires a different meaning, discussion of a directory does not mean the entire directory for all cache lines of a home node.

Figure 1:
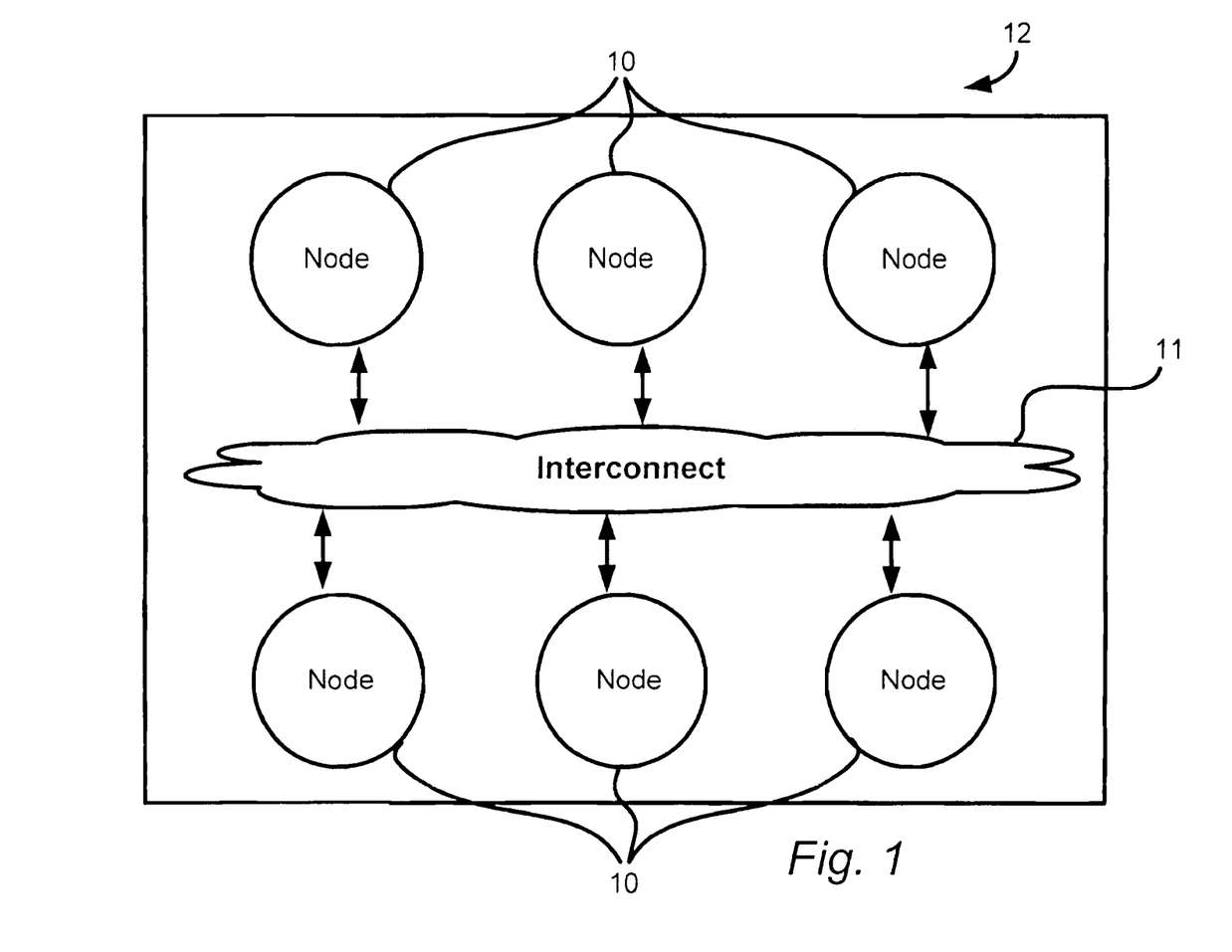
FIG. 1 schematically shows a generic representation of a multi-node computer system that may be configured in accordance with illustrative embodiments of the invention.

FIG. 1 schematically shows a generic representation of a multi-node computer system 12 that may be configured in accordance with illustrative embodiments of the invention. In this embodiment, the computer system 12 has six nodes 10 that communicate through some generic interconnect apparatus 11. All of the nodes 10 have one or more of memory, a microprocessor, or an I/O interface (see FIG. 2 for examples of such components). FIGS. 3-6 show some details of the processes used by the nodes 10 to share the cache of each of the nodes 10.

Of course, discussion of six nodes 10 is for illustration only. Various embodiments can be used with computer systems having more nodes 10 (e.g., hundreds or thousands of nodes) or fewer nodes 10 (e.g., two or three nodes). Accordingly, discussion of a specific number of nodes 10 is for illustrative purposes only and not intended to limit the scope of various embodiments.

Figure 2:
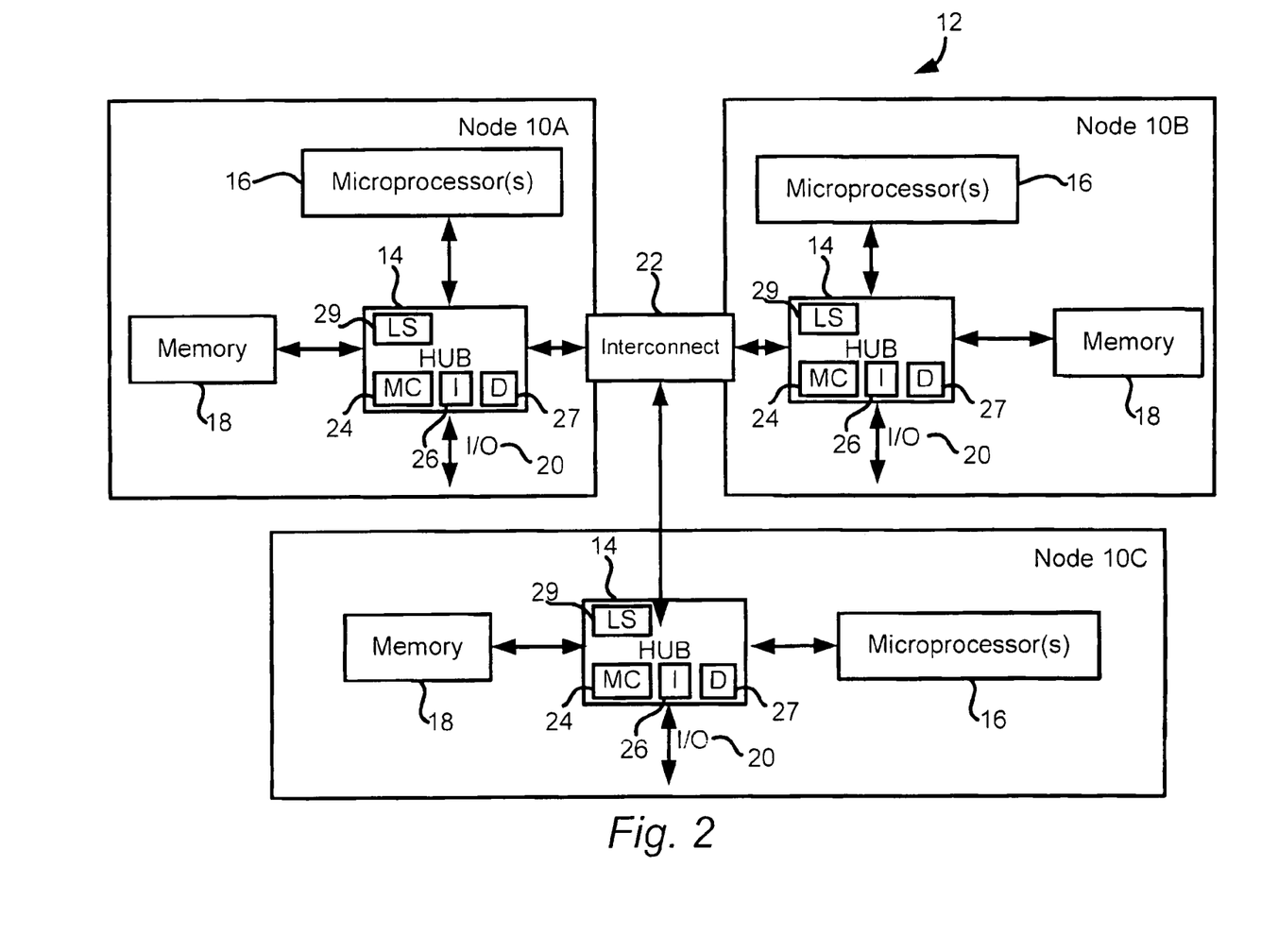
FIG. 2 schematically shows three nodes of a multiprocessor/multi-node computer system that can share memory in accordance with illustrative embodiments of the invention.

FIG. 2 schematically shows one specific implementation of the system of FIG. 1. Specifically, the system in FIG. 2 is a multi-processor/multi-node computer system 12 having three nodes 10A-10C that can share memory in accordance with illustrative embodiments of the invention. The nodes 10A-10C respectively are identified as node 10A, node 10B, and node 10C, and illustratively have the same general components. Specifically, each node 10A-10C has a plurality of components coordinated by a HUB chip 14. In illustrative embodiments, the HUB chip 14 is a gate array chip customized to perform a number of functions, including those discussed below with regard to FIGS. 3 through 6. To perform the below discussed functions, however, the HUB chip 14 also may include a microprocessor instead of, or in addition to, the gate arrays.

The components coupled with the HUB chip 14 include one or more microprocessors 16 that each have a local cache (among other things), memory 18 for storing data to be shared with the other nodes 10A-10C, and an I/O interface 20 for communicating with devices that are external to the computer system 12. In addition, the components also include an interconnect 22 to other nodes in the computer system 12 (i.e., nodes 10A-10C, and other nodes not explicitly shown). In illustrative embodiments, among other things, the HUB chip 14 has a memory controller 24 that controls cache coherency operations, an input 26 for receiving a request when a node 10A, 10B, or 10C is requesting ownership of some cache line in the system 12, and a detector 27 for determining when to delegate ownership of directories to other nodes. Details of the operation of the memory controller 24, input 26, detector 27, and related processes are discussed below.

In one exemplary system 12, the microprocessors 16 include two 4X-ITANIUM microprocessors (distributed by Intel Corporation of Santa Clara, Calif.). The interface between the ITANIUM microprocessor and the external memory system operates on 128 byte cache lines. Transfers between the memory 18, HUB chip 14, and microprocessors 16 are thus made in units of 128 byte cache lines. Moreover, the memory 18, which is schematically shown in the figure, illustratively is a plurality of DIMM memory chips.

The microprocessors 16 on the three nodes 10A-10C cooperate to perform a common task. For example, at least one of the microprocessors 16 on each of the nodes 10A-10C may share responsibilities with those on other nodes 10A-10C for multiplying a complex matrix. To that end, certain data to be processed may be located on any one of the nodes 10A-10C and thus, may require access by the other two nodes 10A-10C to complete their operation.

For example, node 10A may have data (i.e., in its local memory 18) that nodes 10B, 10C must retrieve and process. In other words, the node 10A has data mapped to its portion of the global memory 18. The other nodes 10B and 10C must retrieve and process this data. Accordingly, in this case, the node 10A is considered to be the "home node 10A," while nodes 10B, 10C are considered to be the "consumer nodes 10B, 10C."

In illustrative embodiments, the relevant cache line may be considered to be in no more than one of following states:

Unowned state: no copy is stored in the cache of any microprocessor on any node 10A-10C; the most current copy of the cache line is stored in main memory, Exclusive state: only one microprocessor on one of the nodes 10A-10C has read and write access to the cache line; that one microprocessor, or the relevant node 10A-10C, is the "owner" of the cache line/data and no other node has read privileges at that time, Shared state: one or more microprocessors in the nodes 10A-10C each have shared read-only access to the cache line; each such microprocessor has a copy of the cache line in their respective caches; no microprocessors have write access to the cache line, and Busy state: there is a pending transaction for the cache line, such as during a pending transfer of ownership between microprocessors.

In illustrative embodiments, the HUB chip 14 on each node 10A-10C has a local storage 29 for storing data relating to the shared memory 18. Specifically, the local storage 29 on each node 10A-10C has the following portions:

Directory cache: the directory for the node, which lists 1) the state of cache line sized portions of the local node's memory, and 2) the identity of the exclusive owner node/processor (referred to as the "pointer field), if any, or the identity of sharing nodes/processors (referred to as the "sharing vector," which may be a superset of sharing nodes/processors), if any, Delegation directory cache: directory entries for all directories that have been delegated to the node, Delegation request cache: a listing of cache line(s), and the identity of the respective node(s) to which their directory management functions have been delegated. For example, this cache may have an entry of two cache lines and the respective node(s)/processor(s) that have been delegated control of each those two cache lines.

Although illustratively stored in the directory cache of the local storage 29 within the HUB chip 14, as discussed above, some embodiments store the directory in the top three percent of DRAM memory on the home node 10A. Each directory entry consumes four bytes for each 128 byte cache line. In contrast, other embodiments change error correcting code memory (ECC memory) to allow the directory to be stored with the ECC bits. This approach, however, appears to limit system scaling to a relatively small number of nodes.

At some time, the node 10B may request ownership of a certain shared cache line (i.e., to change the data in such cache line) in the memory 18 of the home node 10A. As noted above, if this ownership request is granted, the node 10B is considered to be the owner (also referred to herein as a "producer") of such data/cache line. The relevant cache line thus is in an exclusive state at this time. It should be noted that if a node owns a cache line, it may be considered to "own" the data in such cache line.

Moreover, the detector 27 also determines if it should delegate control/management of the coherency directory for that cache line to the owner node 10B. If delegated, then the owner node 10B maintains the directory that cache line for some time period. In some embodiments, the owner node 10B may maintain the directory even after it no longer owns the cache line. See FIGS. 3-6 for more details of this process.

As noted above, the discussion of delegation of directory management/control implies that the control/management of the directory entry for the specific cache line is delegated—not the entire directory for all cache lines of the home node. Accordingly, the directory remains with the home node even after control/management is delegated. In that case, the home node may store a record of the fact that the directory has been delegated, and the identity of such delegate node.

It should be noted that the discussion of these three specific nodes 10A-10C is exemplary and thus, not intended to limit all aspects of the invention. Accordingly, as mentioned above with regard to FIG. 1, this discussion applies to multi-node computer systems 12 having more nodes 10 (e.g., hundreds of nodes) or fewer nodes 10, and systems having similar functionality but different architectures.

Figure 3:
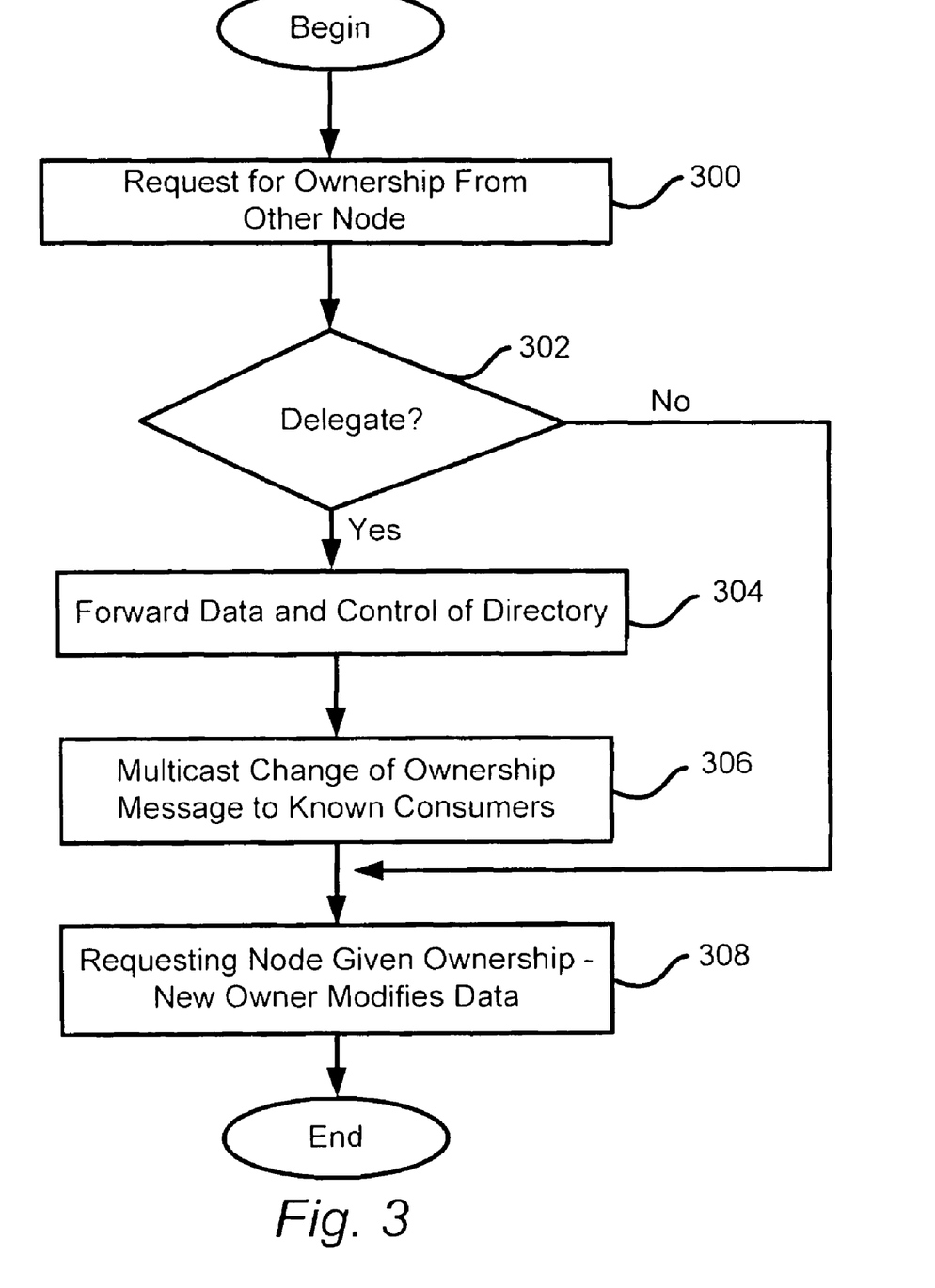
FIG. 3 shows a process of changing ownership of a cache line in accordance with a first embodiment of the invention.

FIG. 3 shows a process of delegating ownership of a cache line in accordance with a first embodiment of the invention. This process will be discussed with reference to the system 12 of FIG. 2 by way of example only. In addition, for purposes of this discussion, it is assumed that data in an unowned state is stored in main memory prior to the first step 300.

The process begins at step 300, in which input 26 of node 10A detects that node 10B, for example, is requesting ownership of the cache line in question. The detector 27 thus may detect this request and determine if the directory (i.e., the directory for the requested cache line) should be delegated to the node 10B.

Specifically, illustrative embodiments do not delegate the directory each time a node 10 requests ownership of the cache line. Instead, the detector 27 of the relevant node makes a determination as to whether the owner node 10B should control the directory (step 302). Among other ways, the detector 27 may delegate directory control when it identifies a stable access pattern that would benefit from delegation (e.g., either a stable writer or a stable producer and set of consumers). If the same node 10B is the most frequent writer but not the owner, then the system 12 may benefit. If the same node 10B is the most frequent writer and the set of subsequent consumers is relatively stable, then pushing the data also may help improve efficiency (discussed below).

In response to the request, if the detector 27 determines that directory delegation is beneficial, then the home node 10A both forwards the cache line data to the node 10B (step 304) and delegates control of the directory to the node 10B. For example, among other ways and as discussed above, the memory controller 24 in the HUB chip 14 of the home node 10A may forward the directory entry for that cache line to the node 10B. The node 10B responsively stores such directory entries in its delegated directory cache on its local HUB chip 14. The node 10B therefore now is considered to be both the owner of the data (i.e., the owner of the cache line) and the node that controls the directory of that cache line.

The process then continues to step 306, in which the memory controller 24 (of either the owner node 10B or the home node 10A) optionally forwards a change of ownership message to nodes in the system 12 that had shared access (if any) to the relevant cache line immediately prior to the request for ownership. To that end, the relevant memory controller 24 may access the directory to determine all nodes that were listed as having shared access (i.e., consumers of the data) immediately prior to the ownership change. After determining the identity of such consumers, the memory controller 24 of the home node 10A or owner node 10B may forward the change of ownership message to such nodes by means of a targeted multicast transmission. In illustrative embodiments, this change of ownership message includes an invalidate command indicating that the data is about to be changed. The receiving nodes 10 responsively store such directory delegation information in their local delegation request caches, and flush their local caches. In alternative embodiments, the change of ownership message may be broadcasted to all nodes in the system 12. Other embodiments, however, do not forward the change of ownership message to any node 10.

The owner node 10B therefore now may modify the data (step 308). Returning to step 302, if the detector 27 determines that it will not delegate the directory, then the process skips steps 304 and 306, and continues at step 308 (modifying the data). If steps 304 and 306 are skipped, then the home node 10A retains control of the directory.

It should be noted that, in a manner similar to other processes discussed herein, various steps of this process may be performed in a different order, or at the same time. For example, steps 306 and 308 may be executed substantially simultaneously. Accordingly, discussion of the specific order of steps is illustrative and may be modified to suit the requirements of a particular implementation.

Continuing with the example above, after executing the process of FIG. 3, the system 12 shown in FIG. 2 is considered to have a home node 10A, and an owner node 10B (also referred to as a "producer") of the given cache line. For sake of discussion for FIG. 4, the owner node 10B also controls the directory of the relevant cache line. Continuing with this example, at least one microprocessor 16 on the node 10C may require read-only access to the relevant cache line and thus, such node is referred to in that capacity as a "consumer node 10C."

Figure 4:
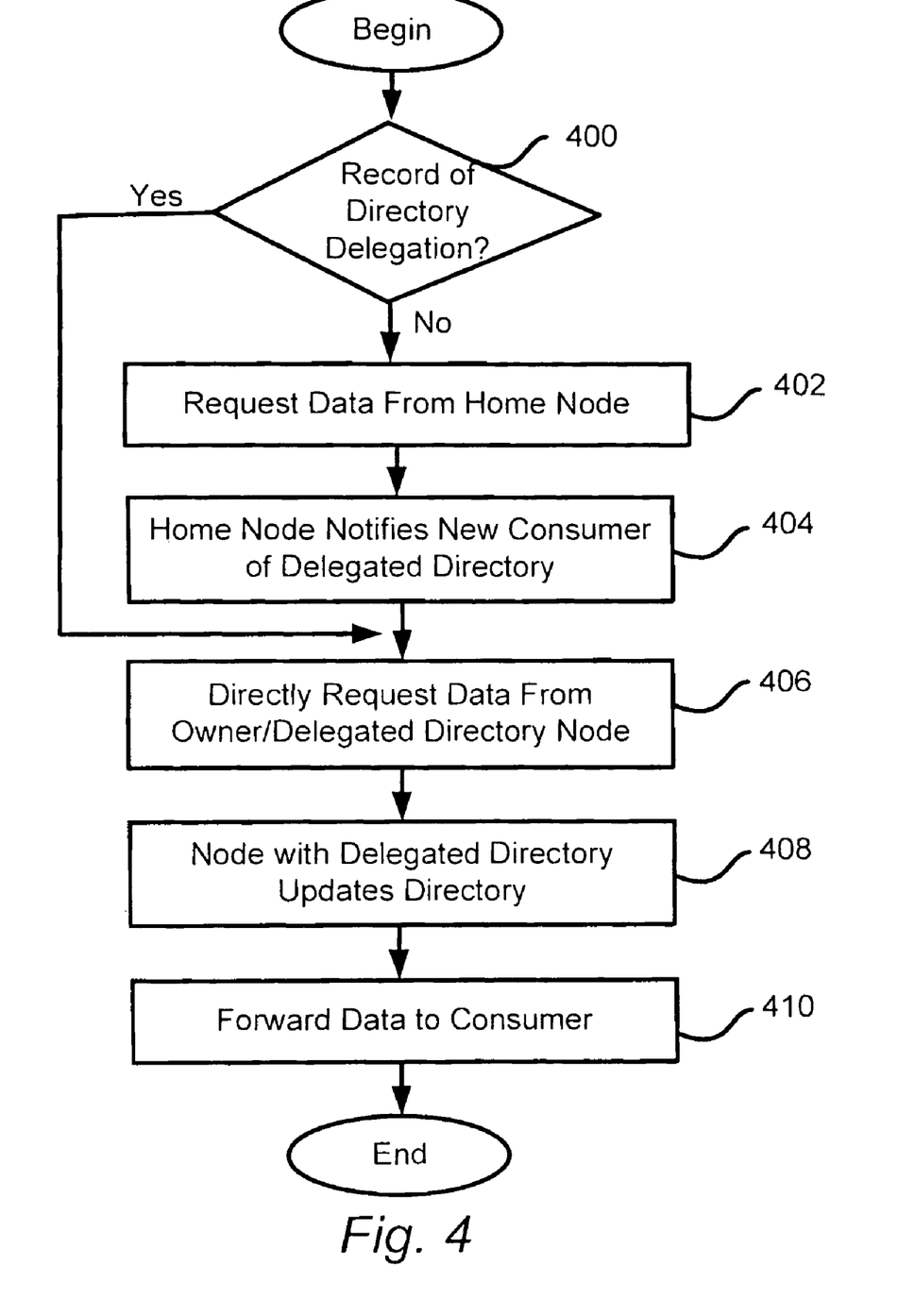
FIG. 4 shows a process for enabling a consumer to retrieve data from a cache line in accordance with the first embodiment of the invention.

FIG. 4 shows a process for enabling a consumer (e.g., node 10C in this example) to retrieve the data in the cache line having its directory delegated to the owner node 10B in accordance with the first embodiment of the invention. The process begins at step 400, in which the consumer node 10C determines where to direct its request for the data. Specifically, at step 400, the consumer node 10C checks its local delegation request cache to determine if the directory of the cache line from which it requests data has been delegated to another node 10. If it does not have any listing of such a delegation, then such node 10C forwards a request for the data to the home node 10A (step 402).

In response to receipt of the request from the consumer node 10C, the home node 10A replies with a message indicating that the node 10B controls the relevant directory (step 404). Specifically, although it no longer controls the directory (it still has a stale copy, as discussed above), the home node 10A illustratively continues to maintain a record of the owner of its relevant cache line, and whether such owner also controls the directory. Accordingly, the home node 10A accesses this record to generate the reply message to the consumer node 10C.

After it receives the reply message, the consumer node 10C stores this change of directory control information in its local delegation request cache, and directly requests the data from the owner node (step 406). Accordingly, if the consumer node 10C requires the data at some later time, it simply accesses its local delegation request cache to determine that the node 10B controls the directory. Such node 10C thus continues to request data directly from the owner node 10B, completely bypassing the home node 10A. In other words, for subsequent data requests, the consumer node 10C does not make a request to the home node 10A for the data.

This is illustrated by returning to step 400, in which an alternative path is taken if the consumer node 10C determines, by accessing its local delegation request cache, that the relevant directory has been delegated to the owner node 10B. Specifically, in that case, the process skips steps 402 and 404, and the consumer node 10C directly requests the data from the owner node 10B, which has control of the directory, at step 406.

The process then continues to step 408, in which the owner node 10B updates the directory if the consumer node 10C is a new consumer (i.e., not listed in its sharing vector for the relevant cache line). To that end, the owner node 10B checks the directory and, if it does not find the identifier of the consumer node 10C as a shared user, simply adds such node's identifier to those already in the sharing vector. The process concludes at step 410, in which the owner node 10B forwards the requested data to the consumer node 10C. At this point, the owner node 10B may be downgraded to shared access only. It nevertheless continues to maintain the directory. Accordingly, if the node 10B re-asserts ownership, it has direct control of the directory and thus, does not require directory information from the home node 10A.

In is anticipated that a stable pattern could collapse, and the delegated directory (entry) may revert to the home node 10A. It is also anticipated that an entry in a node's delegation directory cache may need to be evicted to make room for a newly delegated directory. In these and similar cases, there could be misdirected requests to nodes 10 that do not currently have control of the directory. In these cases, in illustrative embodiments, the node receiving the request will inform the requesting node that it no longer is managing the requested cache line. In response, the requesting node's delegation request cache is flushed of the associated entry and the request should be redirected to the home node 10A.

Figure 5:
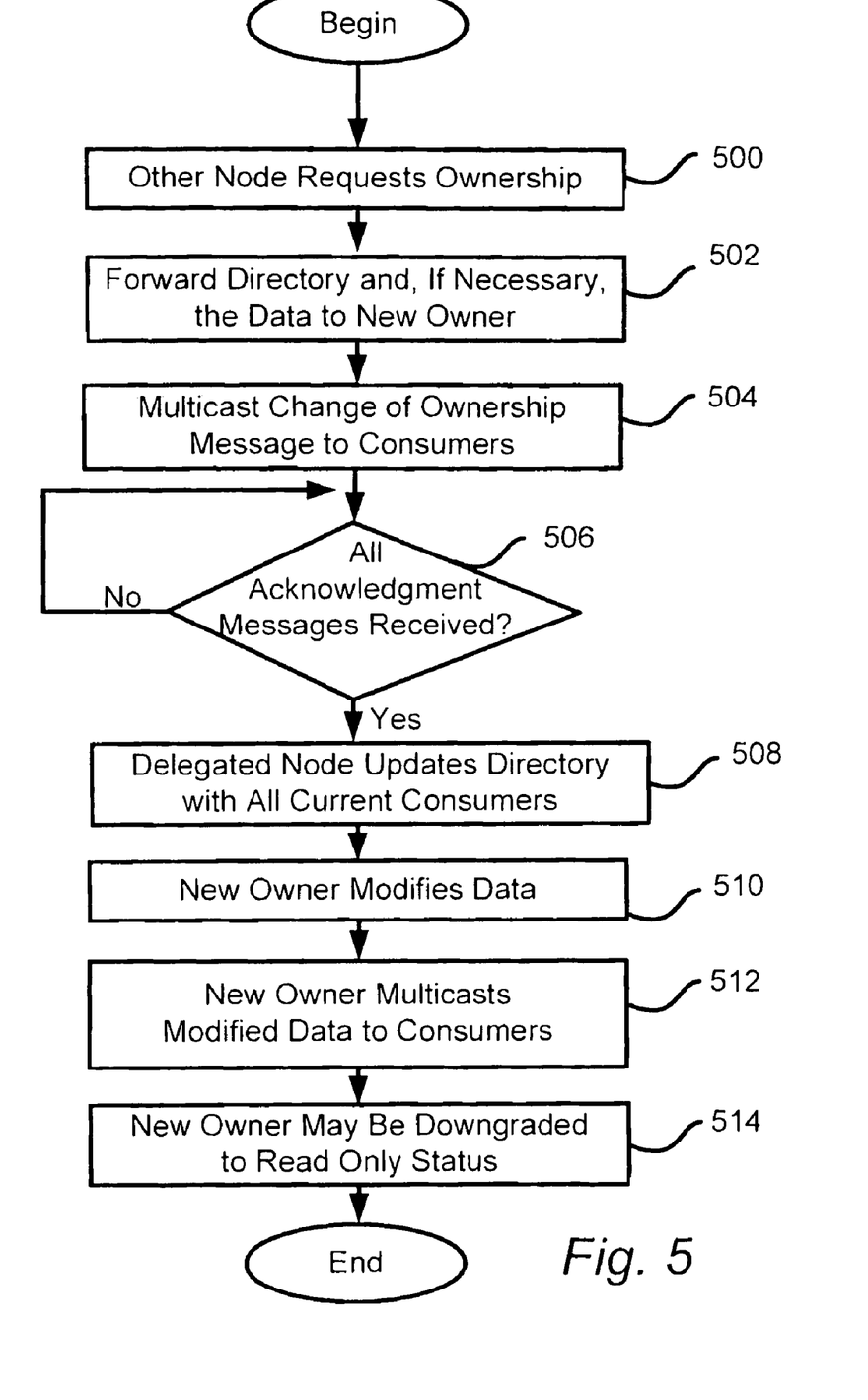
FIG. 5 shows a process of changing ownership of a cache line in accordance with a second embodiment of the invention.
Figure 6:
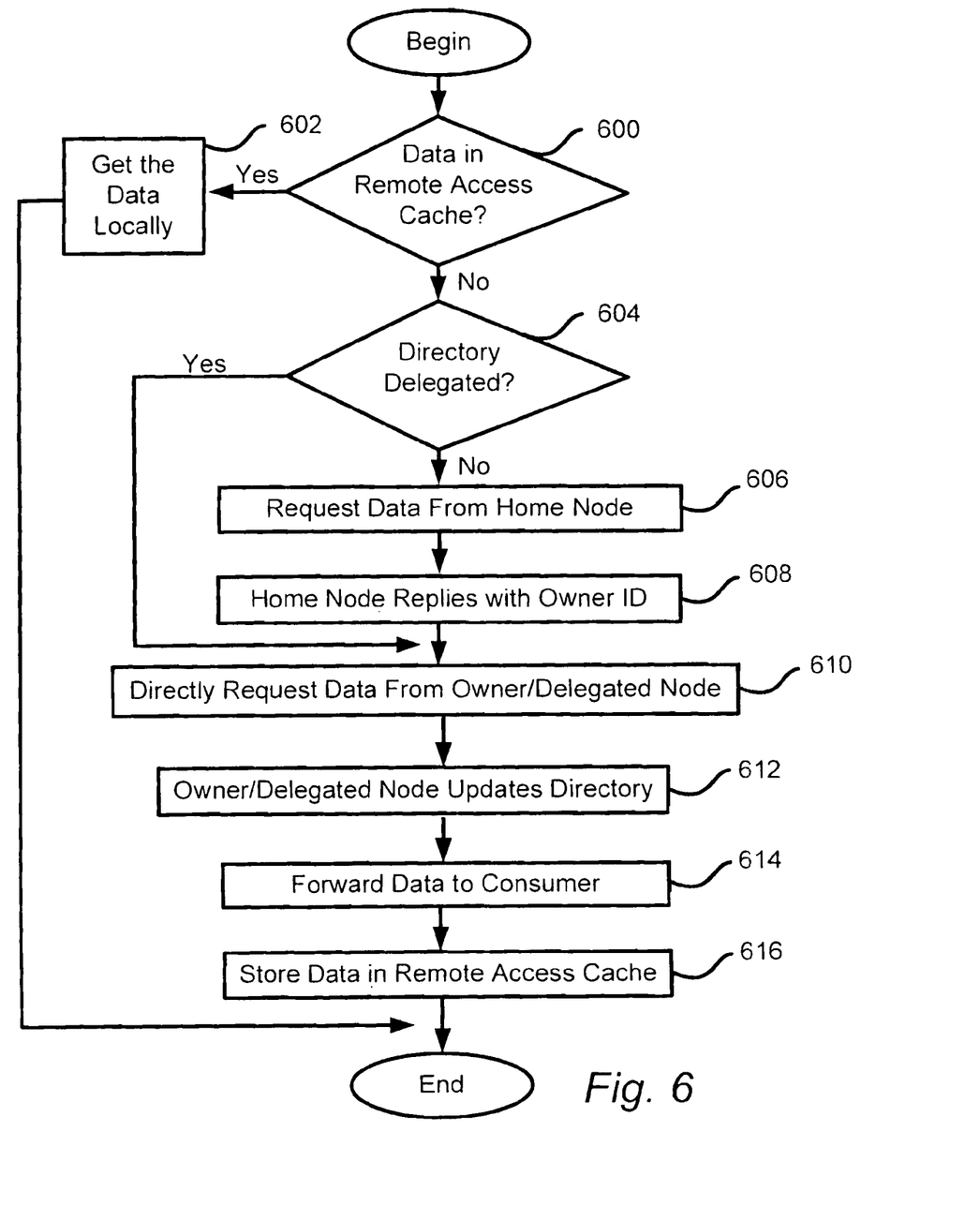
FIG. 6 shows a process for enabling a consumer to retrieve data from a cache line in accordance with the second embodiment of the invention.

In the embodiments discussed above with regard to FIGS. 3 and 4, the consumer must explicitly transmit a request each time it requires data from a node controlling the directory. For example, such node controlling the directory could regain ownership and change the data. In that case, as noted above, the consumer must again request the updated data directly from the owner (which controls the directory) if it needs such data. The local storage 29 of the HUB chips 14 of some embodiments, however, have a remote access cache for locally storing the data each time it is updated. In such embodiments, microprocessors 16 on such nodes check the local remote access cache for the relevant cache lines before making the request for data across the system 12. FIGS. 5 and 6 show such an embodiment.

Specifically, FIG. 5 shows a process of changing ownership of a cache line in accordance with this noted second embodiment of the invention. It should be noted that some of the steps of this process are similar to corresponding steps in FIG. 3. Accordingly, such steps are discussed more cursorily because they are discussed in greater detail above.

The process begins at step 500, in which one of the other nodes of the system 12 requests ownership of data in a cache line on the home node 10A. In response to the request, the home node 10A selectively permits the node 10B to take control of the directory by means of its detector 27. Moreover, if necessary, the home node 10A forwards the data to the node 10B (step 502).

The process then continues to step 504, in which the owner node 10B forwards a change of ownership message to other relevant nodes in the system 12. To that end, the owner node 10B may multicast such message to the relevant nodes. In illustrative embodiments, this change of ownership message includes an invalidate command indicating that the data is about to be changed. Receipt of this message causes the receiving nodes to discard the relevant cache line from all of its local cache structures (e.g., Level 1 and Level 2 caches and the remote access cache). Each node also responsively generates and transmits an invalidation acknowledgment message to the owner node 10B.

The owner node 10B then waits at step 506 to determine if all acknowledgment messages have been received. After receipt of the final acknowledgment message, the owner node 10B updates the directory (i.e., updates the pointer field, step 508). The owner node 10B also modifies the data as necessary (step 510) and multicasts the (modified) data to the current consumers (step 512). Specifically, before discarding the sharing vector, the owner node 10B accesses the delegated directory to determine the consumers in such vector. Using this data, the owner node 10B forwards the modified data to the such consumers. This transmission of the data may be referred to as "pushing" the data to the most recent consumers. It should be noted that this data may be referred to as "given data," or simply "data," whether or not it has been modified. The owner node 10B then is downgraded to shared status (step 514). In illustrative embodiments, each consumer receiving the pushed data is added to the sharing vector and their status is changed to shared, thus enabling them to read the data without contacting another node.

This process may be repeated each time a new owner attempts to take control of the given data. For example, at some subsequent time, a different node, such as node 10C, may take ownership of the cache line and also control the directory. Certain steps of the process discussed with regard to FIG. 5 therefore may be used to change cache line ownership and directory delegation in this manner. In that case, however, the home node 10A updates its local record to reflect the change in ownership and directory delegation. In some embodiments, when this happens, directory delegation is flushed to the home node 10A. Some embodiments, however, forward the directory directly to the new node 10C.

Accordingly, after executing the process of FIG. 5, each time the owner node 10B changes the given data (i.e., after it re-asserts its ownership of the cache line), it forwards such given data to all consumer nodes 10 in the sharing vector. Such current consumer nodes 10 (and home node 10A if it too is a consumer) therefore are not required to affirmatively request the data from the owner node 10B each time such data is required. Instead, such nodes simply check their remote access cache. Of course, in illustrative embodiments, the remote access cache is flushed whenever some node takes ownership of the relevant cache line. Nodes that are not in the sharing vector at the appropriate time, however, still illustratively request the data from the home node 10A.

FIG. 6 shows a process used by consumer nodes to request the given data (i.e., when implementing the second embodiment as discussed with regard to FIG. 5). In a manner similar FIG. 5, many of the steps of this process also are substantially the same as those discussed above with regard to a previous figure; namely, FIG. 4. Accordingly, see the discussion above for more details of many of those steps.

The process begins at step 600, in which the consumer node 10C accesses its local remote access cache to determine if the given data is locally stored. If such data is locally stored, the consumer node 10C simply retrieves the data locally, thus ending the process.

Conversely, if the data is not in the remote access cache, the consumer node 10C determines if the directory has been delegated (step 604). To that end, the consumer node 10C accesses its delegation request cache to determine if the relevant directory for the cache line in question has been delegated. If it has been delegated, the process skips steps 606 and 608, and continues at step 610 (discussed below).

If the directory has not been delegated, then the consumer node requests the given data/cache line from the home node 10A. Specifically, at step 606, the consumer node 10C forwards a request for the given data to the home node 10A.

In response to receipt of the request from the consumer node 10C, the home node 10A replies with a message indicating that the node 10B is the owner of the requested data and controls its directory (step 608). Specifically, as discussed above, although it no longer controls the directory, the home node 10A illustratively continues to maintain a record of the owner of its relevant cache line.

After it receives the reply message, the consumer node 10C directly requests a read-only copy of the data from the owner node 10B (step 610). The owner node 10B then updates the sharing vector to list the consumer node 10C as a consumer (step 612), and forwards the given data to the consumer node 10C (step 614). The process concludes at step 616, in which the consumer node 10C receives and stores the requested data in local storage 29 (e.g., in a remote access cache).

Accordingly, as suggested above, illustrative embodiments should improve system performance by reducing data requests to the home node 10A. For example, take the case when node 10B controls the directory for home node 10A, but is not currently the owner because of an intervening consumer request for a shared copy. At some subsequent time, that node 10B may reassert ownership. Because it already has control of the directory, it is not required to access the home node 10A to perform the necessary processes that require directory information (e.g., sending invalidate messages to nodes in the sharing vector). Instead, the node 10B simply directly retrieves the necessary data from its local storage 29, and performs the necessary processes. Moreover, certain consumers can access the data in the cache line by directly retrieving the data from the node 10B, thus bypassing the home node 10A.

In addition, various embodiments should reduce remote read miss stalls. Local caching of the given data, as discussed with regard to FIGS. 5 and 6, should further these goals by reducing latency associated with retrieving updated data from the owner.

Various embodiments of the invention may be implemented at least in part in any conventional computer programming language. For example, some embodiments may be implemented in a procedural programming language (e.g., "C"), or in an object oriented programming language (e.g., "C++"). Other embodiments of the invention may be implemented as preprogrammed hardware elements (e.g., application specific integrated circuits, FPGAs, and digital signal processors), or other related components.

In an alternative embodiment, the disclosed apparatus and methods (e.g., see the various flow charts described above) may be implemented as a computer program product for use with a computer system. Such implementation may include a series of computer instructions fixed either on a tangible medium, such as a computer readable medium (e.g., a diskette, CD-ROM, ROM, or fixed disk) or transmittable to a computer system, via a modem or other interface device, such as a communications adapter connected to a network over a medium. The medium may be either a tangible medium (e.g., optical or analog communications lines) or a medium implemented with wireless techniques (e.g., WIFI, microwave, infrared or other transmission techniques). The series of computer instructions can embody all or part of the functionality previously described herein with respect to the system.

Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies.

Among other ways, such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web). Of course, some embodiments of the invention may be implemented as a combination of both software (e.g., a computer program product) and hardware. Still other embodiments of the invention are implemented as entirely hardware, or entirely software.

Although the above discussion discloses various exemplary embodiments of the invention, it should be apparent that those skilled in the art can make various modifications that will achieve some of the advantages of the invention without departing from the true scope of the invention.

What is claimed is:

1. A method of controlling data sharing in a shared memory computer system having a plurality of nodes, the plurality of nodes including a home node and a second node, the home node having given data in a cache line in home node memory, the home node also having a directory identifying the state of the cache line, the method comprising:
   detecting a request for ownership of the cache line, the request being received from the second node; and
   enabling the second node to control the directory after receipt of the request.

2. The method as defined by claim 1 further comprising permitting the second node to modify the given data and store the given data on the second node after the given data is modified.

3. The method as defined by claim 2 further comprising:
   forwarding the given data to a set of consumer nodes in the system after the given data is modified.

4. The method as defined by claim 1 further comprising enabling the second node to update the directory after the second node controls the directory.

5. The method as defined by claim 1 further comprising: the second node receiving a request directly from a third node for a read copy of the given data, the third node bypassing the home node to make the request.

6. The method as defined by claim 1 further comprising: forwarding a message to a set of consumer nodes in the system, the message identifying the second node as the node controlling the directory.

7. The method as defined by claim 1 wherein a new node in the plurality of nodes requests access to the given data from the home node, the method further comprising:
   the home node forwarding a redirect message to the new node, the redirect message indicating that the second node controls the directory; and
   in response to receipt of the redirect message, the new node directly requesting a read copy of the given data from the second node.

8. The method as defined by claim 7 further comprising:
   the second node forwarding the given data to the new node; and
   the second node downgrading to a shared state to the cache line.

9. The method as defined by claim 1 wherein a third node requests ownership of the cache line after the second node controls the directory, the method further comprising:
   enabling the third node to control the directory after receipt of the request from the third node.

10. The method as defined by claim 1 wherein enabling comprises determining if the home node will control the directory or if the second node will control the directory.

11. An apparatus for controlling data sharing in a shared memory computer system having a plurality of nodes, the plurality of nodes including a home node and a second node, the home node having given data in a cache line in home node memory, the home node also having a directory identifying the state of the cache line, the apparatus comprising:
   a request input for receiving a request for ownership of the cache line of the home node, the request being received from the second node; and
   a memory controller operatively coupled with the request input, the memory controller enabling the second node to control the directory after the request input receives the request.

12. The apparatus as defined by claim 11 wherein the second node has logic for modifying the given data and storing the given data on the second node after the given data is modified, the apparatus further comprising:
   an output for forwarding the given data to a set of consumer nodes in the system after the given data is modified.

13. The apparatus as defined by claim 11 further comprising:
   a second input for the second node to receive a request directly from a third node for a read copy of the given data, the third node bypassing the home node; and
   logic that forwards the given data to the third node from the second node.

14. The apparatus as defined by claim 11 further comprising:
   an output for forwarding a message to a set of consumer nodes in the system, the message identifying the second node as the node controlling the directory.

15. The apparatus as defined by claim 11 wherein a third node requests ownership of the cache line after the second node controls the directory, the memory controller enabling the third node to control the directory in response to receipt of the request from the third node.

16. A computer program product for use on a computer system for controlling data sharing in a shared memory computer system having a plurality of nodes, the plurality of nodes including a home node and a second node, the home node having given data in a cache line in home node memory, the home node also having a directory identifying the state of the cache line, the computer program product comprising a computer usable medium having computer readable program code stored thereon, the computer readable program code comprising:
   program code for detecting a request for ownership of the cache line in the home node, the request being received from the second node; and
   program code for enabling the second node to control the directory in response to receipt of the request.

17. The computer program product as defined by claim 16 further comprising:
   program code for enabling the second node to modify the given data and store the given data on the second node.

18. The computer program product as defined by claim 17 further comprising:
   program code for forwarding the given data from the second node to a set of consumer nodes in the system after the given data is modified.

19. The computer program product as defined by claim 16 further comprising:
   program code for causing the second node to process a request directly from a third node for a read copy of the given data, the third node bypassing the home node.

20. The computer program product as defined by claim 16 further comprising:
   program code for forwarding a message to a set of consumer nodes in the system, the message identifying the second node as the controller of the directory.

21. The computer program product as defined by claim 16 further comprising:
   program code for receiving a request from a third node for ownership of the given data; and
   program code for relieving control of the directory from the second node and causing the third node to control the directory in response to receipt of the request from the third node.

22. The computer program product as defined by claim 16 wherein the program code for enabling comprises program code for selectively enabling the second node to control the directory in response to receipt of the request.

* * * * *